Patented May 14, 1940

2,200,615

UNITED STATES PATENT OFFICE 2,200,615

METHOD OF AND COMPOSITION FOR CLEANING AND RENDERING METAL SURFACES IMMUNE FROM RUST

Clete L. Boyle, Detroit, Mich.

No Drawing. Continuation of application Serial No. 85,554, June 16, 1936. This application December 1, 1937, Serial No. 177,656

9 Claims. (Cl. 148—6.5)

This invention relates to an improved method of treating the surface of iron or steel preparatory to painting the same. It is a continuation of application Serial No. 85,554, filed June 16, 1936.

The treatment set forth is particularly intended for use on iron or steel structures such as bridges, buildings, ships, or large steel sections, sheets, or parts, et cetera. Wherever the word "steel" is used herein to designate the metal surface to be treated it is intended where applicable and unless otherwise specified to include iron.

Either as a result of exposure or as a result of heat treatment the surface of steel acquires an oxide coating. These oxide coatings may be either rust or they may be some sort of heat scale formed on the surface of the steel when it is fabricated or processed. Either rust or scale, or both, may be present on the surface of the metal. Hereinafter such term "oxide coating" is intended, unless otherwise specified, to include rust and/or scale. A multiplicity of complex iron oxides are covered by this term "oxide coating."

Such coatings include tightly adherent rust and/or scale and loose rust and/or scale. A surface so coated is entirely unsuited for painting because the oxide coating is constantly changing in composition and amount. It might be termed an active mutable coating. If such a surface is painted the coating mutations continue even after the surface has been covered with paint and cause the paint to become loose and pop off.

Heretofore it has been a practice to first thoroughly clean the steel surface to be painted removing therefrom all of its oxide coating. Such clean surface was then painted over or treated with an acid solution intended to render it more resistant to oxidization and more adaptable for painting.

Such acid solutions were applied to the steel surface by washing or spraying or by immersion of the metal in a tank of the solution. The chemical reaction which resulted from washing or spraying was very slight and such treatments were of little value. To increase the chemical reaction the immersion treatment was preferred. Such immersion was generally continued for several minutes and the solution was commonly used in a heated state. Following the treatment the solution remaining on the surface was washed or wiped off or subjected to a heat treatment to prepare the surface for painting. Such immersion treatment was costly and slow, and was not applicable to large steel sections.

It has been found that if a steel surface covered with an oxide coating is first subjected to a physical or mechanical treatment which thoroughly removes all the loose scale and rust therefrom but leaves thereon a tightly adherent oxide coating, that such tightly adherent oxide coating may be converted into a coating possessing unusually good characteristics as a foundation for painting.

Due to its mutable character, the oxide coating, even though tightly adherent, is wholly unsuited as a foundation for painting. Its mutation will continue even after it is covered with paint. My conversion treatment transforms it into a substantially immutable coating and increases its tight adherence. As a result it becomes a particularly good paint foundation.

While prior practices included removal of the oxide coating so that the virgin metal surface might be painted or subjected to a chemical displacement reaction, the practice of this invention involves utilization of the oxide coating on the metal and requires its presence for the carrying out of the invention. A steel surface from which all rust and scale has been removed will not respond satisfactorily to the treatment herein set forth. If the treatment here outlined were used on a steel surface from which the oxide coating had been completely removed such surface would not be benefited thereby but would be rendered wholly unsuited for painting as will hereinafter appear.

This invention comprises the treatment of a steel surface covered with an oxide coating. Such surface is first subjected to a mechanical or physical treatment, such as wire brushing or the like, to remove all loose rust and/or scale but leaving upon the surface of the metal an oxide coating which is tightly adherent thereto. Such tightly adherent coating generally comprises relatively pervious rust and scale which varies from relatively impervious hard smooth scale to rough relatively porous scale. As a result of the physical treatment the coating is rendered more responsive to the conversion treatment but its responsiveness varies as the coating varies. Such tightly adherent but mutable oxide coating is treated with a water solution of phosphoric acid as hereinafter set forth which converts it into a relatively immutable phosphate coating and makes permanent its tightly adherent characteristic.

Once converted this coating retains its tightly adherent character and as a result of its conversion resists oxidation and change. Salt spray tests, salt water immersion tests, and field tests have proven that paint adheres thereto in a good condition for a much longer period of time than if the surface of the steel were not so coated.

The treatment prescribed by this invention differs from the prior practices above referred to not only in that it involves conversion of a coating wholly unsuited for painting into a coating advantageous for painting, but it involves substantial differences in treatment. My phosphoric acid solution is applied to the surface of the steel at atmospheric temperature, though it is not harmful if it is used warm. It is applied only in such a quantity as is required to wet the surface as distinguished from prolonged immersion. This wetting of the metal surface may be accomplished by spraying or brushing. It is commonly applied to structural steel by brushing. Furthermore, the solution is allowed to dry normally on the surface without further treatment or removal.

My solution works its way into all of the pores and crevices of the tightly adherent oxide coating. The rust portions take it up readily and are converted into a phosphate coating. The tight but hard scale portions are cemented down around the edges as the solution creeps into and fills the crevices and reacts with their walls. Within ten to thirty minutes after the solution has been applied it spends itself thereon and the acid in the solution is substantially used up. The coating dries and there remains on the coating over the steel surface a dry whitish powder. The steel is now ready for painting without further treatment. Paint may be applied directly over the powder covered surface. Should there be no oxide coating on the surface of the metal which is treated the phosphoric acid will not be used up but will remain on the surface as a sticky substance which is unsuitable to paint over and this process is not suitable for use on a steel surface free from such oxide coating. The extent to which the oxide coating is converted into a phosphate coating will depend upon its thickness and character. Where it is stated herein that the oxide coating is converted into a phosphate coating it is meant that such portion thereof, greater or less as the case may be, is so converted as to change the coating from an active mutable coating to an inactive immutable one when covered with paint.

This solution as used preferably comprises 10% by volume of ortho-phosphoric acid 75% by weight; water 90% by volume; metallic ion 0.07 gram atomic weight per liter of solution; and wetting agent 10.0 grams per liter of solution.

There are many wetting agents which might be employed. A large number of suitable wetting agents are to be found in the group of sulphonated amino acids. A suitable example from such group is dicetyl aniline 2:4 disulphonic acid.

The above formula describes the solution as used upon the metal surface, but for commercial sale and transportation it is preferred to make the ingredients three times as concentrated and to dilute it with water at the time of use. It may be diluted at the time of use with one or two parts of water. As above set forth it has been diluted with two parts of water. The extent of dilution may be greater or less, depending upon the conditions of use. Less concentrated solutions may be used if the oxide coating is particularly thin.

In such formula two to three percent of the water may be replaced with a water soluble oil solvent. This is desirable if the surface of the steel to be treated carries oil or grease. Different oil solvents may be employed but a suitable one is mono butyl ether of ethylene glycol because it is infinitely soluble in water and because it is also a good solvent for oil and grease. Other solvents which are suitable and which might be employed are ethyl methyl ketone, diacetone alcohol, etc.

Either the metallic ion ingredient, the wetting agent ingredient, or the oil solvent ingredient may be omitted from the solution though each serves a desirable purpose and it is preferred that all be employed.

The metallic ions which have been found to be advantageous for use are those whose phosphates or acid phosphates are insoluble in water. Among the metallic ions which are advantageous are chromium, zinc, iron, magnesium, aluminum, calcium, arsenic, tin, and nickel. These metals are representative of all of the families in the periodic system and any metals belonging to the same families as those given should be suitable providing their phosphates are insoluble in water. The percentage of metallic ions employed is such that the amount of phosphoric acid required to convert them into phosphates in the solution is only a very small portion of the acid present therein.

In preparing the solution the metal ions are introduced by dissolving the oxides or carbonates of the metals in a water solution of phosphoric acid. In the case of chromium the metallic ions of which have been found highly suitable, it is easiest and cheapest to dissolve chromium trioxide in the water solution of phosphoric acid and to add some sugar. The sugar in the presence of the acid reduces the chromic acid and trivalent chromium ions are formed. When this reduction is complete the wetting agent and the organic solvents may be added to the solution. Should these be added before the sugar they will be oxidized. Such method is particularly desirable because chromium phosphate is many times more expensive than chromium trioxide. Furthermore, chromium oxide will not dissolve except in boiling 75% phosphoric acid whereas chromium trioxide is soluble in water.

It is believed that as the phosphoric acid is consumed and becomes low enough in concentration these metal phosphates precipitate out due to their insolubility in water and are inseparably embedded in the iron phosphate coating being formed as the result of the reaction of the acid and the oxide and therefore build a more compact coating.

Generally rust is porous while scale may be either porous or hard and smooth. The porous surface reacts readily to the solution while the hard smooth scale is relatively unreactive. In this connection the wetting agent serves two definite functions. First, it thins out the liquid so that it flows onto the hard smooth unreactive surface areas in a very thin film. Second, it facilitates the penetration of the liquid into the pores and crevices of the reactive surface areas. Thus only little liquid is present where little is desired and a considerable amount is present where such amount is desired.

The percentage of phosphoric acid employed might be varied in the solution as used from 5 to 20% by volume of the 75% by weight phosphoric acid specified though 7 to 15% by volume represents the preferred range. Approximately 10% by volume has been found most satisfactory generally. The percentage of phosphoric acid present should not substantially exceed the amount which will be used up in the reaction upon the coating wetted with the solution. Such an excess is present if there is a sticky acid residue left on the surface.

The amount of metallic ions employed should not exceed the amount required to make a saturated solution of the metallic phosphate. It would not exceed two or three times the amount set forth in the preferred formula. The amount of wetting agent set forth in the preferred formula is an amount which has been found satisfactory for any good wetting agent. It may be varied as desired to produce good penetration and dispersion. The percentage of water soluble oil solvent may be varied from two to ten percent depending upon its character and the conditions present. An amount approximating that set forth as preferred has been found most satisfactory generally.

What I claim:

1. That method of preparing a steel surface for painting which comprises subjecting a steel surface covered with an oxide coating to a mechanical treatment which removes the loose coating material therefrom and leaves thereon the oxide coating which adheres tightly thereto, applying to such tightly adherent oxide coating a water solution of phosphoric acid in sufficient quantity to wet the coating and wherein the phosphoric acid constituent is present in sufficient amount to convert the oxide coating into a phosphate coating (but does not substantially exceed the amount which can be used up in such reaction) and allowing the solution to remain upon the coating until it dries.

2. That method of preparing a steel surface for painting which comprises subjecting a steel surface covered with an oxide coating to a mechanical treatment which removes the loose coating material therefrom and leaves thereon the oxide coating which adheres tightly thereto, applying to such tightly adherent coating a water solution of phosphoric acid in sufficient quantity to wet the coating and wherein metallic ions of a metal whose phosphate is insoluble in water are present in an amount not exceeding the saturation point of the solution and wherein the phosphoric acid constituent is present in sufficient amount to convert the oxide coating into a phosphate coating but is not present in an amount substantially in excess of that which can be used up in such reaction and allowing said solution to remain upon the coating until it dries.

3. That method of preparing a steel surface for painting which comprises subjecting a steel surface to a mechanical treatment which removes the loose coating material therefrom and leaves thereon the oxide coating which adheres tightly thereto and applying to such tightly adherent coating a water solution of phosphoric acid in sufficient quantity to wet the coating and wherein metallic ions of a metal whose phosphate is insoluble in water are present in an amount not exceeding the saturation point of the solution and wherein the phosphoric acid constituent is present in sufficient amount to convert the oxide coating into a phosphate coating but is not present in an amount substantially in excess of that which can be used up by such reaction and wherein a wetting agent is present in sufficient quantity to cause the solution to thin out on the relatively impenetrable areas of the coating and to creep and penetrate into the crevices of the relatively porous coating areas carrying the metal ion phosphate therein and allowing the solution to remain upon the coating until it dries.

4. That method defined in claim 1 characterized in that the solution contains a water soluble oil solvent adapted to dissolve oil and grease upon the surface of the metal.

5. That method of producing a tightly adherent rust resistant substantially immutable phosphate coating on a steel surface which comprises subjecting a steel surface covered with a tightly adherent mutable nonrust resistant oxide coating to a phosphoric acid water solution containing water insoluble phosphate metallic ions in an amount varying from 0.05 to 0.2 gram atomic weight per liter of solution and wherein phosphoric acid is present in an amount varying from 7 to 15% by volume of the solution and allowing the solution to remain thereon until it dries.

6. That method of preparing a steel surface for painting which comprises subjecting a steel surface covered with an oxide coating to a mechanical treatment which removes the loose coating material therefrom and leaves thereon an oxide coating which adheres tightly thereto, applying to such tightly adherent coating a water solution of phosphoric acid in sufficient quantity to wet the coating and wherein the phosphoric acid constituent is present in an amount approximating 10% by volume of the solution and a water soluble wetting agent is present in an amount approximating ten grams per liter of solution and metal ion phosphate insoluble in water is present in an amount approximating one-tenth of a gram atomic weight per liter of solution and allowing the solution to remain upon the coating until it dries.

7. That method of applying rust resisting paint coats to a structural steel surface which comprises providing a structural steel surface with an exposed tightly adherent oxide coating, applying to such tightly adherent oxide coating a water solution of phosphoric acid in sufficient quantity to wet the coating and wherein the phosphoric acid constituent is present in sufficient amount to convert the oxide coating when the chemical reaction is complete into a dry hard tightly adherent phosphate coating, allowing the solution thus applied to remain upon the coating until it dries and forms a hard protective phosphate coating over the surface of the steel, and applying paint coats over the dry phosphate coating without further treatment to the steel surface.

8. That method of preparing a steel surface for painting which comprises subjecting a steel surface covered with an oxide coating to a mechanical treatment which removes the loose coating material therefrom and leaves thereon the oxide coating which adheres tightly thereto, applying to such tightly adherent coating a water solution of phosphoric acid in sufficient quantity to wet the coating and wherein metallic ions of a metal whose phosphate is insoluble in water are present in an amount not exceeding the saturation point of the solution and wherein the phosphoric acid constituent is present in sufficient amount to convert the oxide coating into a phosphate coating but is not present in an amount substantially in excess of that which can be used up in such reaction and in an amount varying from 5% to 10% by volume of the solution, allowing said solution to remain upon the coating until it dries and thereafter applying a paint coat to the surface.

9. That method of preparing a steel surface for painting which comprises subjecting a steel surface covered with an oxide coating to a mechanical treatment which removes the loose coating material therefrom and leaves thereon the oxide coating which adheres tightly thereto, applying to such tightly adherent oxide coating a water solution of phosphoric acid in sufficient quantity to wet the coating and wherein the phosphoric acid constituent is present in sufficient amount to convert the oxide coating into a phosphate coating (but does not substantially exceed the amount which can be used up in such reaction) and into which solution chromium trioxide ($CrO_3$) has been introduced and allowing the solution to remain upon the coating until it dries and thereafter applying a paint coat to the surface.

CLETE L. BOYLE.